No. 679,097. Patented July 23, 1901.
W. VAN WAGONER.
REVERSING MECHANISM FOR MOTOR VEHICLES.
(Application filed Apr. 26, 1901.)

(No Model.)

Witnesses:
Henry L. Deck
F. F. Schuzinger

William Van Wagoner
Inventor.
By Wilhelm Bonner
Attorneys.

THE NORRIS PETERS CO., PHOTO-LITHO., WASHINGTON, D. C.

UNITED STATES PATENT OFFICE.

WILLIAM VAN WAGONER, OF SYRACUSE, NEW YORK, ASSIGNOR TO CENTURY MOTOR VEHICLE COMPANY, OF SAME PLACE.

REVERSING MECHANISM FOR MOTOR-VEHICLES.

SPECIFICATION forming part of Letters Patent No. 679,097, dated July 23, 1901.

Application filed April 26, 1901. Serial No. 57,555. (No model.)

*To all whom it may concern:*

Be it known that I, WILLIAM VAN WAGONER, a citizen of the United States, and a resident of Syracuse, in the county of Onondaga and State of New York, have invented a new and useful Improvement in Reversing Mechanism for Motor-Vehicles, of which the following is a specification.

This invention relates to the reversing-gear of the engines which are employed for the propulsion of motor-vehicles. The reversing mechanism of such engines is usually provided with a reversing-lever which is shifted by hand and locked in the forward or backward position or in the intermediate stop position by engagement with a notched segment. Sometimes this lever is disengaged from the segment and shifted by a jolt of the vehicle, and sometimes the lever is shifted inadvertently to the wrong position, so that the vehicle backs when it is intended to go ahead, or vice versa. Either of these happenings is likely to result in accidents.

The object of my invention is to hold the reversing-lever securely in the forward position except when it is held in the backward position by the operator and to return it automatically to the forward position as soon as it is released, thereby preventing the vehicle from going backward except while the reversing-lever is held in the backward position by the operator.

Figure 1:
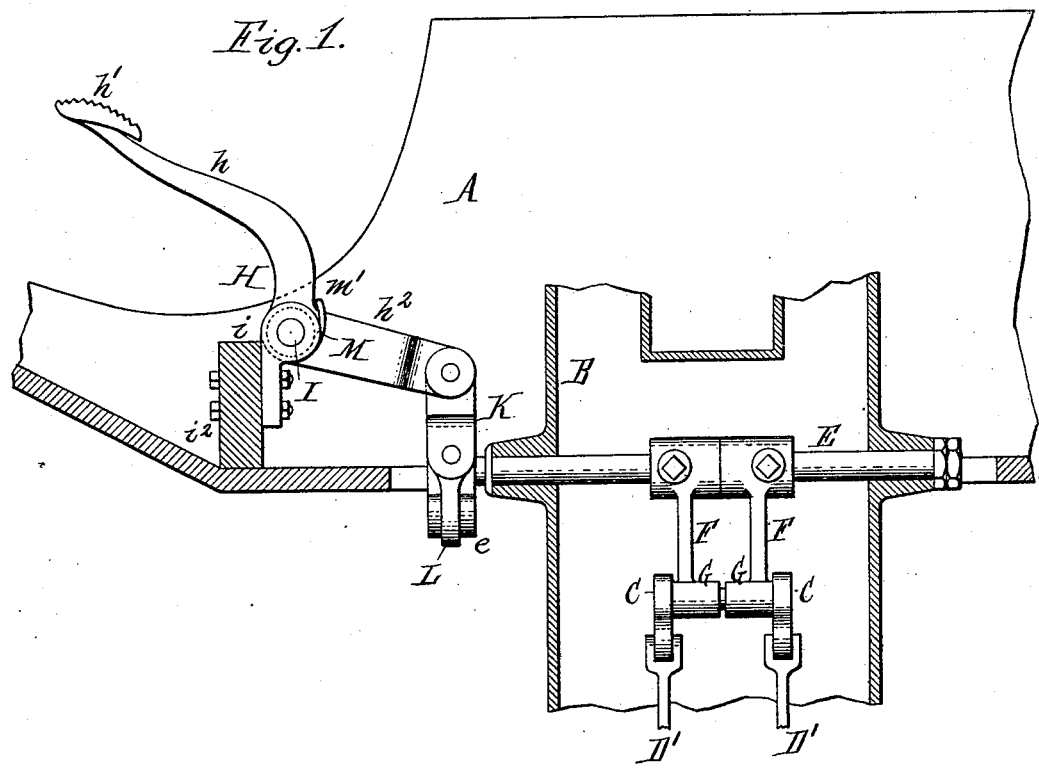
Figure 2:
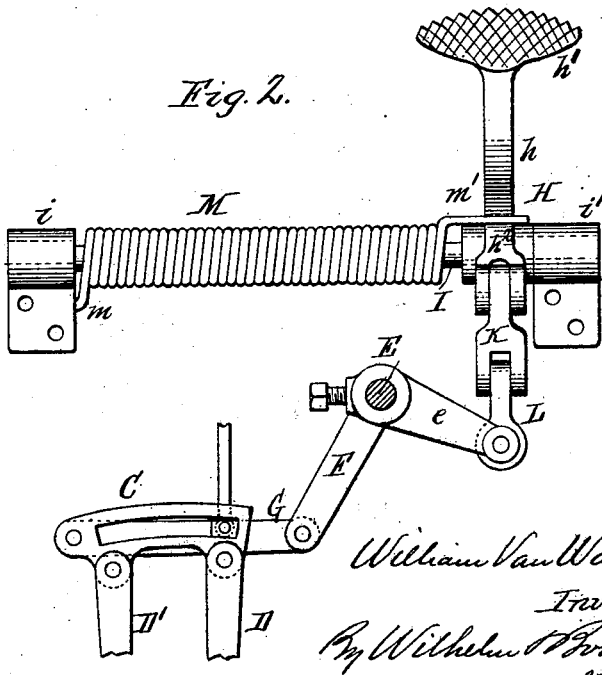

In the accompanying drawings, Figure 1 is a longitudinal sectional elevation of my improved reversing mechanism. Fig. 2 is a rear elevation of the same.

Like letters of reference refer to like parts in both figures.

A indicates the body of a motor-vehicle of any description; B, the frame of a steam-engine secured thereto in any suitable manner; C, the links of the valve-gear arranged transversely side by side within the engine-frame; D, the forward eccentric-rods; D', the backward eccentric-rods; E, the longitudinal rock-shaft, which is journaled in the engine-frame, for shifting the links of the valve-gear; $e$, the actuating rock-arm, by which said rock-shaft is shifted; F, rock-arms secured to said shaft, and G rods which connect said arms with the links. All of these parts may be of any suitable construction.

H is the reversing-lever, which is arranged in the lower portion of the vehicle, so as to be conveniently depressed by the foot. This lever is secured to a transverse rock-shaft I in any suitable manner—for instance, by pressing the lever upon the shaft. The rock-shaft I is journaled in bearings $i\ i'$, which are preferably secured to a cross-bar $i^2$ of the body-frame of the vehicle. The long arm $h$ of the lever projects forwardly and upwardly and is provided with a foot-plate $h'$, and the short arm $h^2$ of the lever projects rearwardly and is connected with the arm $e$ of the rock-shaft E of the valve-gear by any suitable means. As shown in the drawings, the rear arm $h^2$ of the foot-lever is connected with the rock-arm $e$ by two short links K L, each having its two pivots arranged at right angles to each other, so as to form a flexible connection.

In the raised position of the front arm $h$ of the foot-lever, as shown in the drawings, the valve-gear stands in the forward or go-ahead position. The foot-lever is held in this position by a spring which is sufficiently stiff to hold the valve-gear securely in this position and sufficiently yielding to allow the foot-lever to be depressed for shifting the valve-gear to the backward position. A simple and convenient way of applying this spring is shown in the drawings and consists in arranging a coiled spring M around the rock-shaft I of the foot-lever and connecting one end $m$ of the spring to a fixed part—for instance, the bearing $i$ of the rock-shaft I—and the other end $m'$ to the foot-lever.

When no pressure is applied to the reversing-lever, the valve-gear is held in the go-ahead position by the spring. In order to shift the valve-gear to the backward position, the foot-lever is depressed. The valve-gear remains in this position only so long as the pressure is applied to the reversing-lever. As soon as the lever is released the valve-gear is returned to the forward position by the spring. The vehicle therefore runs normally forward and runs backward only so long as the operator holds the reversing-lever in the backward position. By arranging the reversing-lever in the form of a foot-lever the control of the vehicle is rendered very easy and convenient.

I claim as my invention—

1. The combination with the reversible valve-gear of an engine, and the reversing-lever, of a spring which holds said lever in the forward position but permits the lever to be moved to the backward position and returns the lever automatically to the forward position when released, substantially as set forth.

2. The combination with the reversible valve-gear of an engine, of a reversing foot-lever, a rock-shaft to which said lever is secured, and a spring having one end connected with a stationary part and the other with said foot-lever to hold the latter in the forward position, substantially as set forth.

3. The combination with the actuating rock-arm of the reversible valve-gear of an engine, of a reversing-lever, a spring which holds said lever in the forward position but permits the lever to be moved to the backward position, and a flexible connection between said reversing-lever and said actuating rock-arm of the valve-gear, substantially as set forth.

Witness my hand this 23d day of April, 1901.

WILLIAM VAN WAGONER.

Witnesses:
PETER B. COLE,
WILLIS GLEASON.